J. T. DIETZ.
CUTTING TOOL.
APPLICATION FILED JULY 22, 1918.
1,345,320.
Patented June 29, 1920.
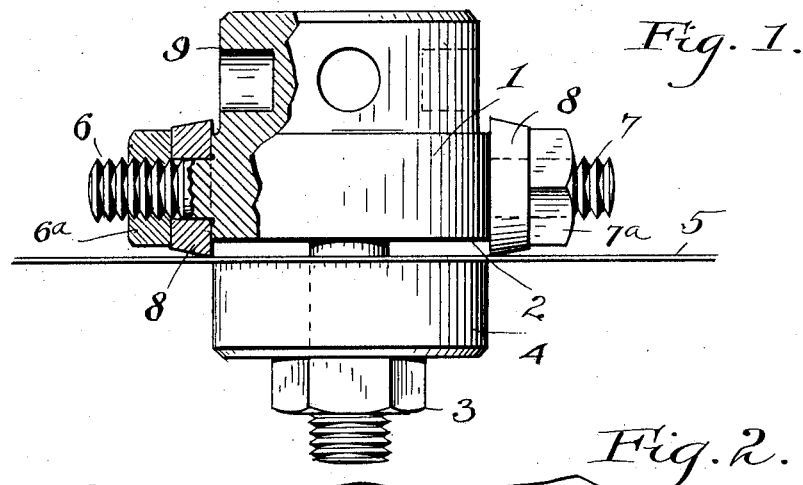
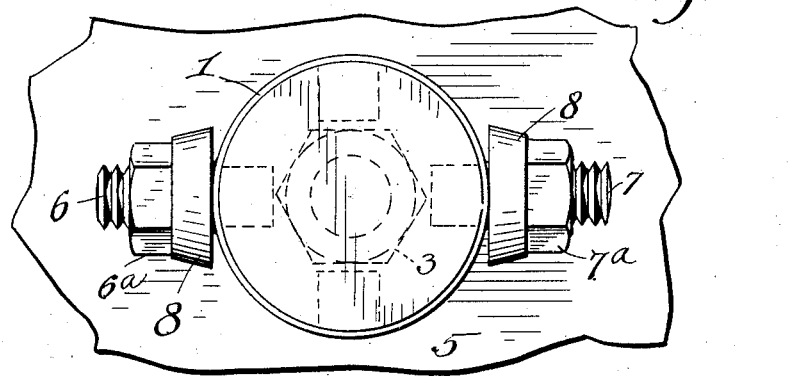
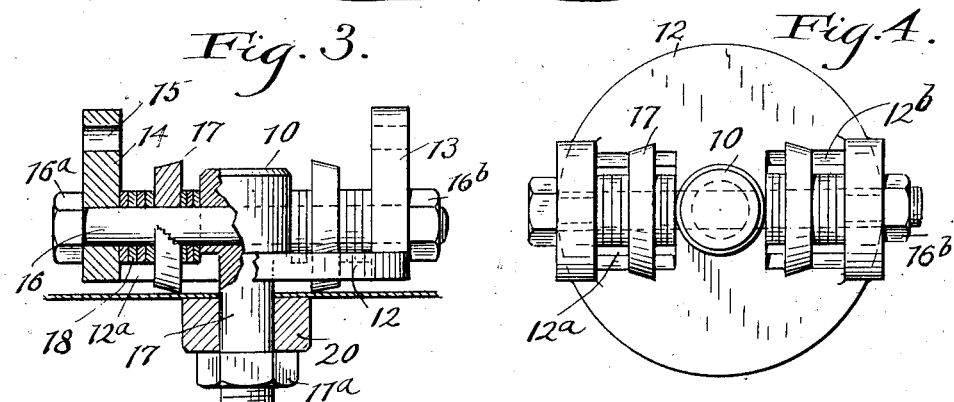
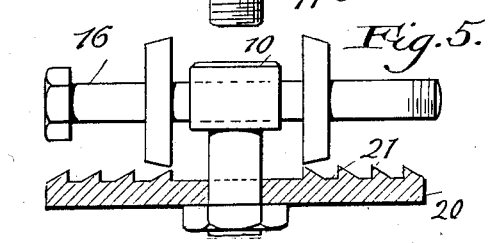
Inventor
John T. Dietz
By
Thurston & Rivis
attys

UNITED STATES PATENT OFFICE.

JOHN T. DIETZ, OF CLEVELAND, OHIO.

CUTTING-TOOL.

1,345,320.  Specification of Letters Patent.  Patented June 29, 1920.

Application filed July 22, 1918. Serial No. 246,025.

*To all whom it may concern:*

Be it known that I, JOHN T. DIETZ, a citizen of the United States, residing at Cleveland, in the county of Cuyahoga and State of Ohio, have invented a certain new and useful Improvement in Cutting-Tools, of which the following is a full, clear, and exact description.

This invention relates to a device by which circular holes or openings may be cut in sheet metal, and while the use of the invention is not restricted, it may be said that the device has particular utility in cutting holes or openings in the metal walls of electrical wall boxes for the purpose of permitting the insertion of conduits which carry electric cables.

The object of the invention is to provide a device for cutting holes in sheet metal, which is compact, and may be easily assembled upon such an article as a sheet metal box for the purpose before described.

Generally speaking, the invention may be said to comprise the elements and combinations thereof set forth in the accompanying claims.

Reference should be had to the accompanying drawings forming a part of this specification in which Figure 1 is an elevation with portions in section of one form of my device; Fig. 2 is a top plan view of the showing in Fig. 1; Fig. 3 is an elevation with portions in section of a modified form of the device; and Fig. 4 is a top plan view of the showing in Fig. 3; Fig. 5 is a sectional elevation of a modification of my invention with portions removed.

For the purpose of disclosing the subject matter of my invention I will describe a device which has particular adaptability for use in cutting circular holes or openings in electrical wall boxes, although I do not intend by this disclosure to limit the use of the invention thereby.

Sheet metal wall boxes for containing switches, fuses, etc., as usually manufactured, are provided with certain partially removed slugs which are formed by partly punching out certain portions of the sheet metal wall, it being possible to remove these slugs by a sharp blow with a hammer.

These boxes as usually manufactured, contain openings of certain size in accordance with the general requirements of the trade, but in installing electrical conduits it frequently becomes necessary to use a pipe or metallic conduit which is of larger size than that provided for by the openings in the box, and consequently it becomes necessary to remove additional metal in order to accommodate and receive the end of the larger sized conduit to be used.

It will be appreciated that wall boxes of the character described are more or less difficult to get at in order to cut holes through the same, and it is a matter of considerable difficulty to cut a hole through the wall of such a box making a workman-like job.

The device of this invention, as before stated, is particularly adaptable for this purpose, although, of course, as will be apparent from the description of the device, the device is generally adaptable for cutting openings in sheet metal.

Referring to Fig. 1 there is shown one form of the device embodying my invention. This device comprises what I may term a body portion 1. From the body portion there extends a bolt-like member 2. This member at its outer end is threaded and adapted to receive a nut 3.

Upon the member 2 there is what may be termed a die or backing member 4 which is adapted to lie against the sheet of metal 5 to be cut. This member 4 is of the same diameter as the hole or opening it is desired to cut in the sheet metal.

The body portion 1 also supports or carries short extensions 6 and 7. These extensions are threaded, at least in part, and upon each extension there is a cutter 8 which is mounted so that it may rotate upon the extension. The cutters are held in proper position by means of nuts such as indicated at 6$^a$ and 7$^a$.

The upper portion of the body 1 is formed in some suitable manner so that it may receive an instrument by which it may be turned. In the present instance I have shown sockets, such as indicated at 9, these sockets being adapted to receive a rod by which the body may be turned.

In using the device, a wrench or other suitable holding instrument is applied to the nut 3, and this wrench is held so as to prevent rotation of the nut 3. The body portion 1 is then turned and by this turning action the cutters 8 are caused to cut the metal of the sheet 5, the member 4 coöperating with these cutters 8, as will be clearly understood from an inspection of the drawings.

Due to the fact that the nut 3 is held against rotation while the body 1 and the bolt-like extension 2, which is a part of the body 1, rotate, the nut 3 will travel upon the bolt-like extension 2, thereby causing the member 4 to press against the metal sheet 5 and move it against the cutters 8, and this movement continues until finally the cutters pierce the metal and the disk or slug which engages with the member 4 is removed from the metal sheet.

In using the device which has just been described in connection with cutting a hole in a sheet metal wall box, I proceed to remove one of the partially punched slugs which form a part of all commercial wall boxes, as has heretofore been described, and insert through the opening thus made, the bolt-like member 2, and then assemble the member 4 and the nut 3 in the manner which has been previously described.

If the metal sheet to be cut is not provided with an opening, it will, of course, be necessary to in some manner punch an opening of sufficient size to receive the bolt-like member 2. The opening thus required is, however, one of small diameter, and there would be no difficulty in providing such an opening.

In Figs. 3 and 4 I have shown a modification of the device which has just been described, and the purpose of this modification is to adapt the device to cut openings of different diameters.

In carrying out this idea I provide a member 10 which has a bolt-like extension 11 threaded at its outer end. The portion 11 extends through an opening in a base 12, substantially at the central portion thereof. The base carries upright members 13 and 14, these members being preferably formed integral therewith. The members 13 at their outer ends are provided with suitable openings such as indicated at 15 for the purpose of receiving an instrument by which the structure may be rotated.

Suitable openings are provided in the uprights 13 and 14 as well as the member 10 through which a shaft 16 may extend. This shaft may be conveniently made up as a bolt having a head 16$^a$, and at its opposite end being threaded to receive a nut 16$^b$, this structure securely holding the bolt-like shaft 16. By the structure provided, the member 16 may be removed for the purpose of adjusting the cutters thereon, as will be presently described.

Upon the member 16 there are oppositely arranged cutters 17. These cutters are free to rotate upon the member 16 and are positioned upon the member 16 by means of shims or washers 18. It will be readily understood that in accordance with the number of washers between the part 10 and the members 13 and 14 the position of the cutters may be determined, at the same time leaving them perfectly free to rotate.

Upon the member 11 there is a backing die member 20 which is held by means of a nut 11$^a$. The action of this member 20 is the same as that described with respect to the member 4.

The base member 12 is provided with suitable slots such as indicated at 12$^a$ and 12$^b$, through which the cutters extend, and these slots are sufficienly long to permit the adjustment of the cutters.

It will be apparent that the member 20 is easily removed from the part 11, and a member 20 of suitable diameter will be employed in accordance with the distance between the cutters. In other words, the diameter of any member 20 which will be used, will be substantially the same as the width between the cutting edges of the cutters, which of course is the same as the diameter of the hole to be cut.

Therefore, by providing a structure such as shown in Figs. 3 and 4, and having a number of such members as indicated at 20, of different diameters, the device is thereby adjustable for the purpose of cutting different sized holes.

As a means for obviating the use of a number of different members 20, I may use a single member such as indicated at 21, provided with a series of concentric ridges, 22. Each ridge has an edge with which, through the sheet to be cut, the cutting edges of the cutters may coöperate.

The advantage of such a construction is obvious.

Having described my invention, I claim:

1. A cutting tool comprising a body portion having an extension which is fixed with respect to the said body, arms fixedly carried by the body portion, cutters mounted upon said arms and in fixed position with respect to said body and said arms, a backing member having an edge of a diameter substantially the same as the distance between the cutters, said cutters coöperating with the said edge in a cutting operation, said backing member being mounted upon the said extension and adapted to receive the material to be cut, and means for moving the backing member upon the said extension during a cutting operation to press the said material against the cutters.

2. A cutting tool comprising a body portion having an extension which is fixed with respect to the body, cutter mounting means carried by said body portion and in fixed position with respect thereto, cutters mounted upon said mounting means, a backing member having an edge of a diameter substantially the same as the distance between said cutters, said backing member being mounted upon said extension and adapted to receive the material to be cut, and means for moving the backing member upon said extension during a cutting operation to press said material against the cutters.

3. A cutting tool comprising a body portion having an extension which is fixed with respect to the body portion, cutter mounting means secured to said body and in fixed position with respect thereto, said cutters being adjustable with respect to the distance between them, a backing member having a plurality of circular edges which are adapted to coöperate with the cutters during a cutting operation, said backing member being mounted upon the said extension and adapted to receive the material to be cut, and means for moving the backing member upon said extension during a cutting operation to press said material against the cutters.

4. In a device of the character described, the combination of a body member, means for supporting a plurality of cutters, said means being fixedly mounted upon the said body member, means for adjusting the cutters with respect to the distance between them, slots formed in said body member through which the lower portions of the cutter extend, a backing member having an edge of a diameter substantially the same as the distance between the cutters, said body portion having a fixed extension which supports said backing member, and means carried by the extension and engaging the backing member whereby the backing member may be moved toward the cutters as the cutters rotate.

In testimony whereof, I hereunto affix my signature.

JOHN T. DIETZ.